Oct. 16, 1951     C. H. YOUNGBERG     2,571,512
DRAWBAR LATCH UNIT FOR DISK HARROWS
Filed March 30, 1945     2 SHEETS—SHEET 1
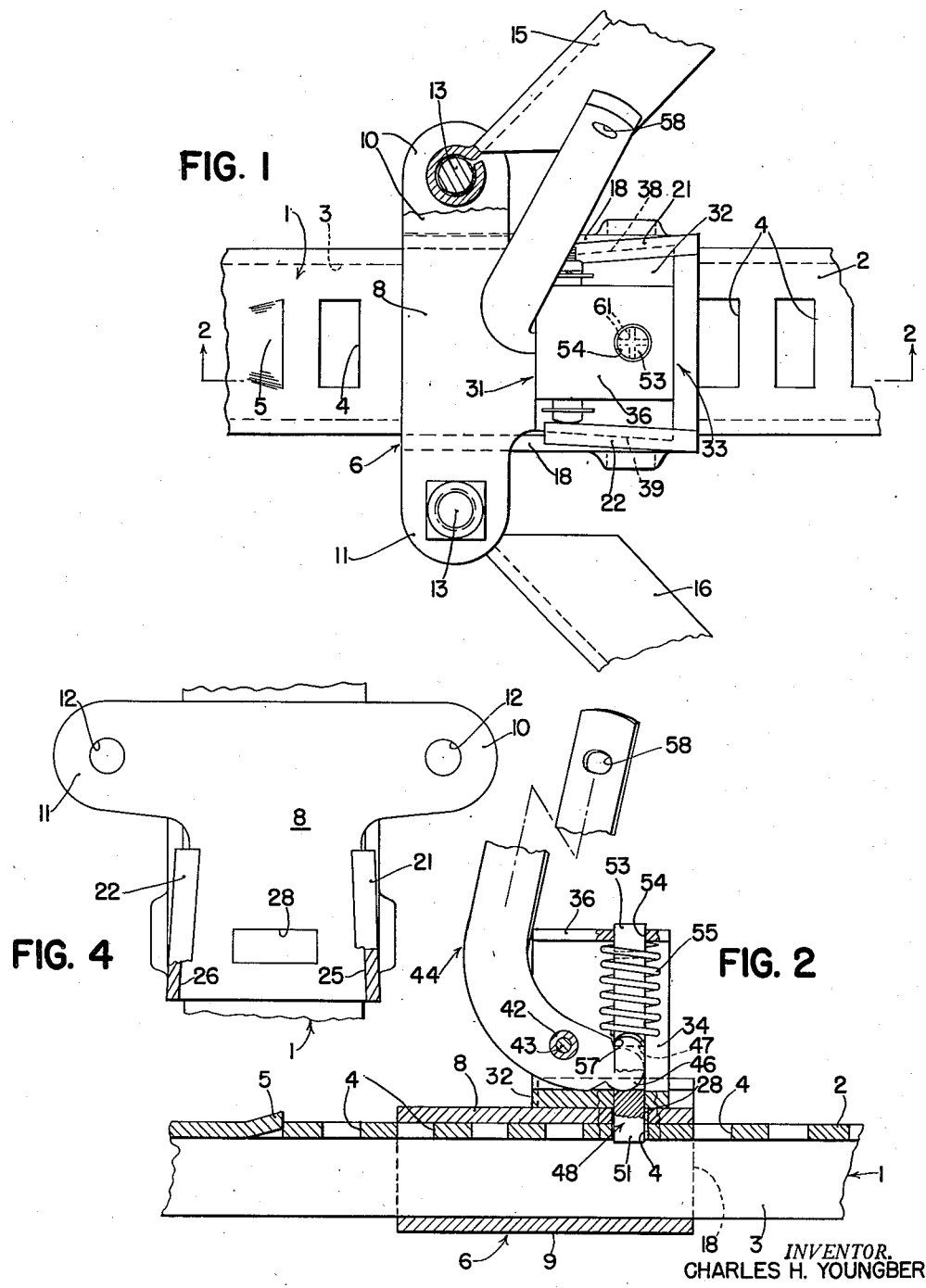
INVENTOR.
CHARLES H. YOUNGBERG
WITNESS
*Clifford zude*
ATTORNEYS

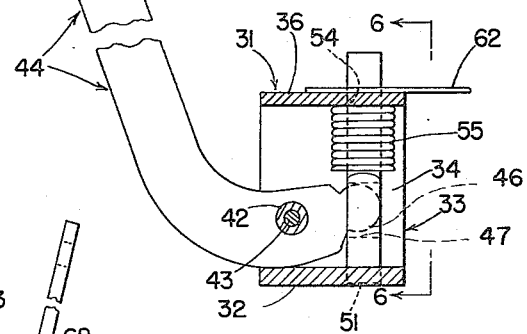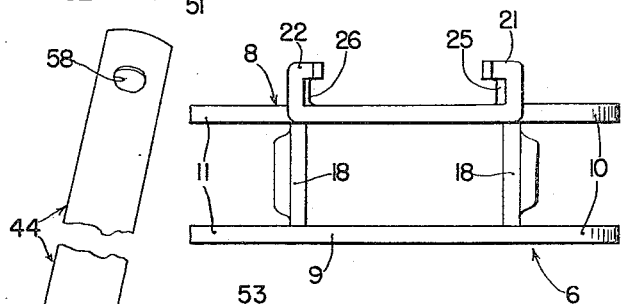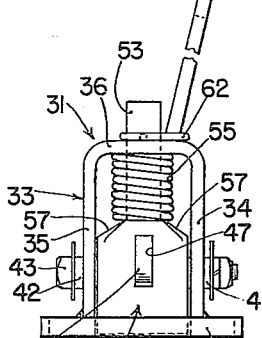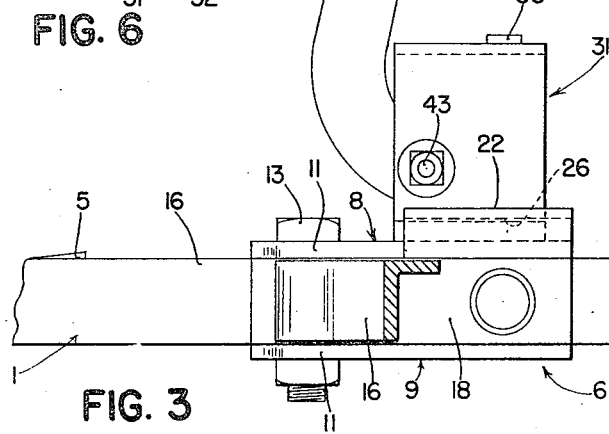

Patented Oct. 16, 1951

2,571,512

UNITED STATES PATENT OFFICE 2,571,512

DRAWBAR LATCH UNIT FOR DISK HARROWS

Charles H. Youngberg, Moline, Ill., assignor to Deere & Company, Moline, Ill., a corporation of Illinois Application March 30, 1945, Serial No. 585,691

13 Claims. (Cl. 55—81)

The present invention relates to agricultural machines and more particularly to machines having parts adapted to be locked together, such as, for example, disk harrows or the like in which a drawbar member is connected with one portion of the disk gang or gangs and a slide, movable along the drawbar member, is connected with the other portion of said gang or gangs.

The object and general nature of the present invention is the provision of a detachable latch box adapted particularly for use on disk harrows of the type that is, for example, convertible from manual control to power lift cylinder control. More particularly, the present invention is directed to disk harrows of the type wherein a latch box, used when the harrow is controlled manually and operated generally between angled and straightened positions by the draft power, may or is required to be entirely removed in order to install the ram unit that forms a part of a hydraulic power control and adapted to be connected with the relatively movable parts of the harrow for adjusting it by power.

Additionally, it is a feature of the present invention to provide a detachable latch box which is normally held in position by the same plunger or other part that locks the relatively movable members which the latch unit controls.

These and other objects and advantages of the present invention will be apparent to those skilled in the art after a consideration of the following detailed description, taken in conjunction with the accompanying drawings in which the preferred embodiment of the invention has been illustrated.

Figure 1 is a fragmentary plan view of a drawbar construction of a disk harrow, showing the detachable latch box in position for manually controlling the angling and straightening of the harrow by the forward or rearward travel of the tractor to which the harrow is normally connected.

Figure 2 is a sectional view taken generally along the line 2—2 of Figure 1.

Figure 3 is a side view of the section shown in Figure 1.

Figure 4 is a top or plan view of the slide showing the latch box removed.

Figure 5 is a sectional view, corresponding partially to the sectional view shown in Figure 2, illustrating the position of the latch plunger when the latch unit is detached.

Figure 6 is a view taken generally along the line 6—6 of Figure 5.

Figure 7 is an end view of the slide shown in Figure 4, with the latch unit removed.

Referring now to the drawings, more particularly Figures 1, 2 and 3, the drawbar construction of the disk harrow is seen to comprise a drawbar member 1, preferably in the form of a channel having a web 2 and side flanges 3. The web of the drawbar member is provided with a plurality of openings 4 and a stop 5 which limits the forward movement, relative to the drawbar member 1, of a slide that is indicated in its entirety by the reference numeral 6. The slide 6 includes upper and lower plates 8 and 9, each having a pair of laterally outwardly extending ears 10 and 11 which are apertured, as at 12, to receive a pair of pivot bolts 13 to which the forward ends of a pair of links 15 and 16 are pivotally connected. The rear end of the drawbar member 1 is connected with the inner ends of the gangs while the links 15 and 16 are connected to the outer ends of the gangs. The upper and lower plates 8 and 9 of the slide member are connected together by a pair of side pieces 18, preferably welded to the upper and lower plates, the parts being dimensioned so that the member 6 slides freely along the drawbar member 1. Forward of the upper ears 10 and 11, the upper plate 8 has its marginal portions 21 and 22 bent upwardly and laterally inwardly, as best shown in Figure 7, to form a pair of latch box receiving grooves or slots 25 and 26, these portions being formed so that the marginal sections 21 and 22 converge rearwardly so that the slots or grooves 25 and 26 are tapered in plan, as best shown in Figures 1 and 4. An opening 28 is formed in the upper plate 8 of the slide 6, between the grooves or slots 25 and 26. This opening is adapted to be aligned with any one of the openings 4 in the drawbar channel 1.

A latch box unit, indicated in its entirety by the reference numeral 31 and shown particularly in Figures 5 and 6, is detachably mounted on the slide 6 and normally is held in position in the groves 25 and 26. The latch unit comprises a base plate 32 and an inverted U-shaped bracket 33 having side walls 34 and 35 connected together by an upper wall 36. The lower edges of the side walls 33 and 34 are secured, as by welding, to the base plate 32. The latter is of tapered formation, the edges 38 and 39 of the base plate 32 being tapered to correspond to the angularity of the grooves 25 and 26 so that, as best shown in Figure 1, the base plate 32 may be engaged in the grooves 25 and 26 on the slide 6, the groves 25 and 26 and edges 38 and 39 forming tongue and groove means for holding the latch unit in place on the slide 6.

The side walls 33 and 34 of the latch box unit are apertured to receive a pair of bushings 41 and 42 that are mounted on a transverse bolt 43 which passes through the lower portion of a trip lever 44. When the bolt 43 is tightened the bushings 41 and 42 are clamped firmly to the trip lever 44 and thereby provide a pivotal support for the lever 44 in the bracket 34. The lower end of the lever 44 is rounded, as at 46, and is received in a central slot 47 formed in a plunger 48 which is mounted in a vertical position in the latch box bracket 44. The plunger 48 has a lower end 51 that is adapted to be projected downwardly through the opening 28 in the upper plate 8 of the slide and the registering opening 4 in the drawbar channel 1 for locking the slide and channel together, as shown in Figure 2. The upper portion of the plunger is reduced to form a shank 53 that extends upwardly through an opening 54 in the upper or central portion 36 of the latch box bracket 34. A spring 55 is disposed between the upper portion of the bracket 34 and the shouldered sections 57 of the plunger 48 for biasing or urging the plunger 48 downwardly relative to the bracket 34 so as to cause it to enter the aligned openings 4 and 28. The upper end of the lever 44 is apertured, as at 58, to receive a cable or pull rope that ordinarily extends to the operator's seat on the tractor and furnishes a means whereby the lever 44 may be swung in a direction to withdraw the plunger 48 from the opening 4 in the channel 1 so as to permit the slide to move relative to the channel 1. So long as the plunger is disposed at least partially in the opening 28 in the plate 8 of the slide 6 the latch box or latch unit 31 is prevented from becoming detached from the slide 6.

If it should be desired to detach the latch unit 31 from the slide 6, which may be desirable in the event a hydraulic ram or the like is to be mounted on the harrow for controlling the gangs, in which case the slide 6 should be free at all times to move relative to the drawbar 1, all that it is necessary to do is to exert sufficient pull on the cable connected to the lever 44 to move the plunger 48 into an uppermost position, shown in Figures 5 and 6, in which position the lower end 51 of the plunger 48 is withdrawn entirely out of the opening 28 in the top plate 8 of the slide 6. The upper or shank end 53 of the plunger 48 is provided with one or more holes 61 drilled or otherwise formed therein, so as to provide an opening in which to insert a quick detachable pin 62 (Figures 5 and 6). This provides a temporary means for holding the plunger 48 in its fully withdrawn or retracted position, with the plunger entirely detached from the opening 28 in the slide plate 8. The latch unit 31 may therefore be slid out of the grooves 25 and 26. Normally, of course, the lever 48 is not pulled into a position disconnecting the plunger from the opening 47.

While I have shown and described above the preferred structure in which the principles of the present invention have been incorporated, it is to be understood that my invention is not to be limited to the particular details shown and described above, but that, in fact, widely different means may be employed in the practice of the broader aspects of my invention.

What I claim and desire to secure by Letters Patent is:

1. In an agricultural implement, a pair of relatively movable parts having registering openings, a latch unit having a plunger adapted to pass through both of said registering openings for locking said parts together, said latch unit including means for withdrawing said plunger from both of said registering openings, and means for slidably mounting said latch unit on one of said parts and accommodating movement of said latch unit relative thereto when said plunger is withdrawn from both of said openings.

2. In an agricultural implement, a pair of relatively movable parts having registering openings, means for mounting said parts for said relative motion, a latch unit having a plunger adapted to pass through said registering openings for locking said parts together, means for withdrawing said plunger from said registering openings, means on one of said parts for slidably mounting said latch unit thereon and accommodating movement of said latch unit relative thereto when said plunger is withdrawn from said openings, means on said latch unit biasing said plunger for movement into said openings, and means connectible with said plunger for temporarily locking said plunger in its withdrawn position to facilitate detaching the latch unit from said one part.

3. In an agricultural implement having a pair of parts to be optionally connected together, each of said parts having an aperture therein and means connecting said parts together for sliding movement so that said apertures may be brought into and out of registry, a latching unit having a plunger adapted to pass through the aperture in one of said parts and into the aperture in the other part when said parts are in a position bringing said apertures into registration for holding said parts together, and cooperating slidably associated tongue and groove means on said one part and on said latch unit and extending generally in a plane parallel to the plane of relative movement between said parts for detachably holding said latch unit on said one part when said plunger is engaged in said apertures.

4. The invention set forth in claim 3, further characterized by means normally acting against said plunger for maintaining the same engaged with at least the aperture in said one part whereby, in cooperation with said tongue and groove means, said latch unit is normally held engaged in operative position on said one part.

5. The invention set forth in claim 3, further characterized by biasing means normally acting against said plunger for maintaining the same engaged with at least the aperture in said one part whereby, in cooperation with said tongue and groove means, said latch unit is normally held engaged in operative position on said one part, said plunger being movable against said biasing means into a position disengaged from the aperture in said one part to provide for sliding said latch unit out of engagement with said one part, and means engageable with said plunger for temporarily holding said plunger in a position to permit removal of the latch unit from said one part.

6. The invention set forth in claim 3, further characterized by said tongue and groove means being tapered thereby providing for attachment and removal of said latch unit from one direction only and serving to define the attached position of the latch unit so as to bring said plunger in a position over the aperture in said one part.

7. In an agricultural implement, a pair of relatively movable parts adapted to be connected together, each of said parts having an opening therein and said openings being adapted to be brought into registry, a latch unit, means connecting said latch unit with one of said parts and constraining said latch unit for sliding movement relative to said one part, said latch unit including a plunger adapted in one position to pass through the opening in said one part and to engage the opening in said other part, and means connected with said plunger and movable through a range of movement sufficient to withdraw said plunger from both openings so as to provide for detaching said latch unit from said one part, movement of said plunger withdrawing means through only the first portion of its range serving to withdraw the plunger from only the opening in said other part, whereby the engagement of said plunger in the opening in said one part serves to prevent any sliding movement of said latch unit relative to said one part but one of said parts may be shifted relative to the other.

8. In a disk harrow, a drawbar member, a slide mounted for movement into various positions along said drawbar member, means having a pair of grooves on said slide spaced apart laterally thereon and extending generally in a plane parallel to the plane of relative movement between said slide and said drawbar member, and a latching unit detachably mounted in said grooves and including means for locking said slide and drawbar.

9. In a disk harrow, a drawbar member, a slide mounted for movement into various positions along said drawbar member, means having a pair of grooves on said slide spaced apart laterally thereon and extending generally in a plane parallel to the plane of relative movement between said slide and said drawbar member, said drawbar member and slide having openings adapted to be brought into registry by said movement of said slide, and a latching unit having a base formed with tongue means adapted to slidably engage in said grooves and a retractable plunger adapted to enter said registering openings and thereby lock said slide on said drawbar member.

10. The invention set forth in claim 9, further characterized by means for normally holding said plunger in a position engaging said slide so as to prevent inadvertent or accidental movement of said latch unit in said grooves, withdrawal of said plunger out of engagement with said slide accommodating removal of said latch unit from said slide.

11. A latch unit comprising a base member having oppositely extending edges shaped in converging relation to form groove-engaging projections, and a plunger adapted normally to extend through said base member into engagement with another part but capable of being withdrawn to a position within said base member.

12. In a disk harrow, a drawbar, a slide mounted for movement on said drawbar and including upper and lower plates embracing said drawbar, the upper plate of said slide having an aperture therein and said drawbar having a plurality of apertures therein, and a pair of spaced apart latch unit engaging portions carried by said upper plate of the slide and disposed generally on opposite sides of the opening in said upper plate for detachably receiving a latch unit.

13. In a disk harrow, a drawbar, a slide mounted for movement thereon, said drawbar having a plurality of openings therein and one portion of said slide having an opening therein adapted to register with any one of the drawbar openings, a latch unit having a base with an opening therein and a plunger adapted to extend down through the opening in said base, the opening in said one portion of said slide and into the opening of said drawbar for locking said slide and drawbar together, and means connecting said latch unit for sliding movement on said one portion of said slide, the disposition of said plunger through the opening in said base and in the opening in said one portion of the slide serving to hold said latch unit against sliding movement relative to said slide.

CHARLES H. YOUNGBERG.

REFERENCES CITED

The following references are of record in the file of this patent:

UNITED STATES PATENTS

| Number | Name | Date |
| --- | --- | --- |
| 444,662 | Clark | Jan. 13, 1891 |
| 2,255,380 | Curtis | Sept. 9, 1941 |